United States Patent [19] [11] Patent Number: 4,609,598
Tucholski et al. [45] Date of Patent: Sep. 2, 1986

[54] ELECTROCHEMICAL CELL

[75] Inventors: Gary R. Tucholski, Parma Heights; Earl J. Chaney, Medina, both of Ohio

[73] Assignee: Union Carbide Corporation, Danbury, Conn.

[21] Appl. No.: 794,541

[22] Filed: Nov. 4, 1985

[51] Int. Cl.$^4$ ............................................. H01M 2/32
[52] U.S. Cl. ..................................... 429/174; 429/181; 429/185
[58] Field of Search ................ 429/174, 181, 184, 185

[56] References Cited

U.S. PATENT DOCUMENTS

| 4,168,351 | 9/1979 | Taylor | 429/48 |
| 4,233,372 | 11/1980 | Bro et al. | 429/174 |
| 4,308,323 | 12/1981 | Bowsky | 429/181 |
| 4,556,613 | 12/1985 | Taylor et al. | 429/181 |

FOREIGN PATENT DOCUMENTS 35074 1/1980 European Pat. Off. .
59-228357 12/1984 Japan .

OTHER PUBLICATIONS

Sandia Report No. 2314, "Glass Corrosion in Liquid Lithium", printed Sep. 1984.

Primary Examiner—Donald L. Walton
Attorney, Agent, or Firm—C. F. O'Brien

[57] ABSTRACT

A hermetically sealed electrochemical cell system of the $Li/MnO_2$, $Li/SO_2$, $Li/C_2F$ or $Li/CF_x$ type having its lithium anode electronically connected to the cell housing thereby rendering the housing the anodic terminal of the cell. A terminal pin extends into the housing and is electronically insulated therefrom by a glass-to-metal hermetic seal. All metal components of the cell electronically connected to the cathode including the terminal pin and cathode collector are made of a non-ferrous metal such as molybdenum to decrease the deposition of a conductive corrosive material on the glass-to-metal seal and resulting corrosion of the seal, thereby increasing the shelf life of the cell.

16 Claims, 2 Drawing Figures

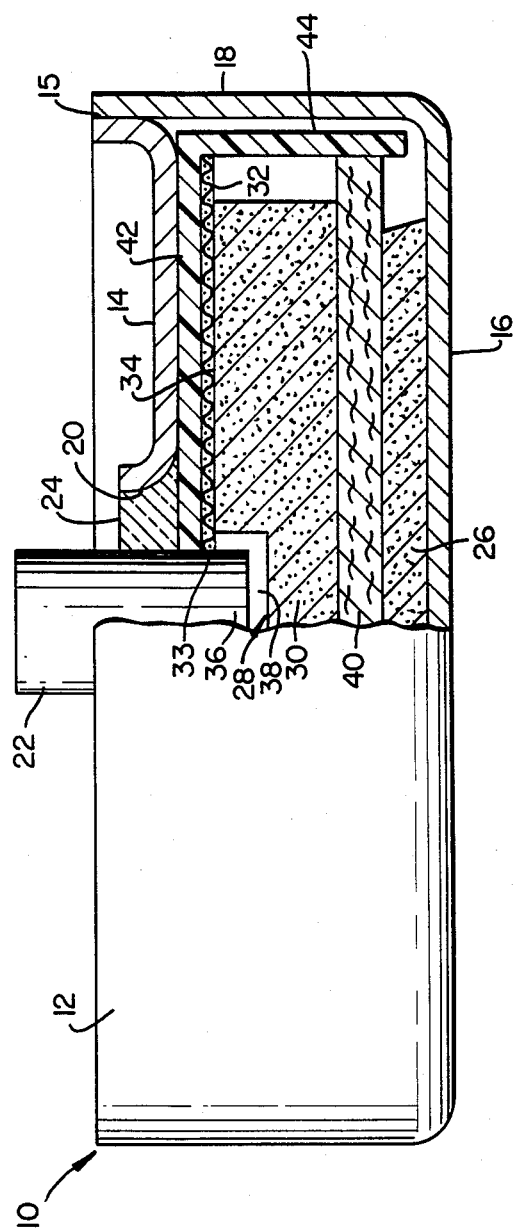
FIG. I

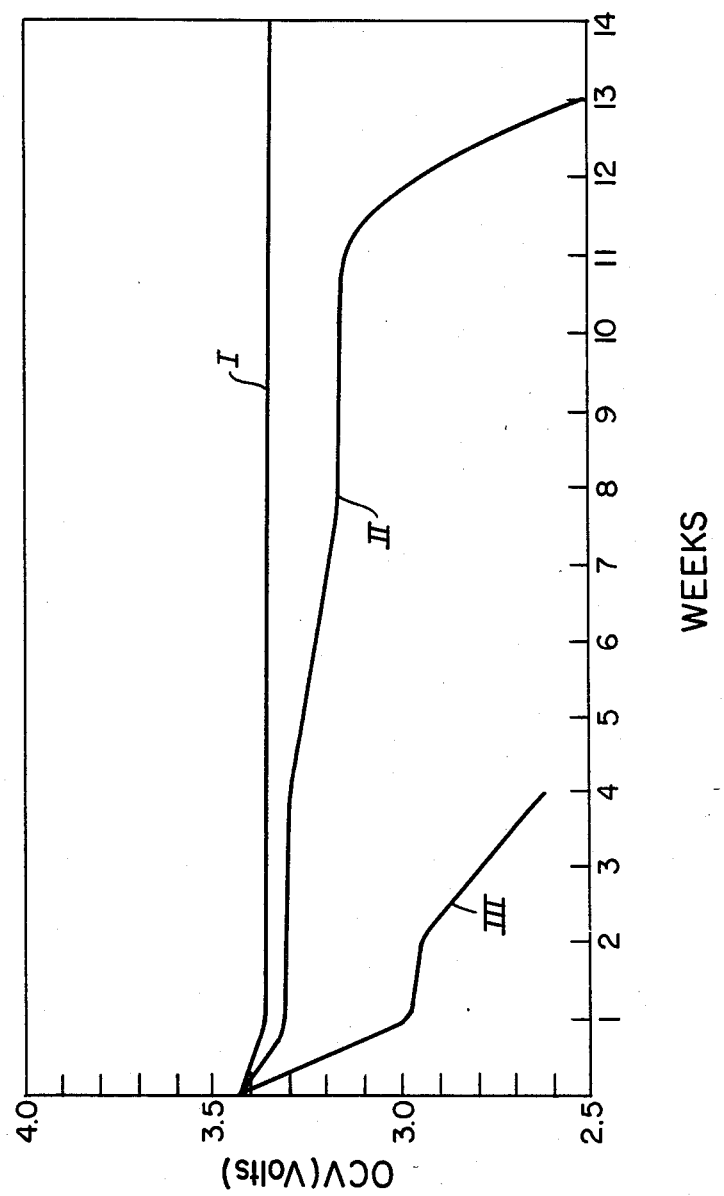

ELECTROCHEMICAL CELL

FIELD OF THE INVENTION

The present invention relates generally to electrochemical cells and in particular to cells utilizing lithium as the anode material.

BACKGROUND OF THE INVENTION

Lithium is well suited for use in electrochemical cells because of its high voltage capability and high output density. In miniature cells such as a button cell, a coin cell or other so called "flat cells" a ferrous metal such as stainless steel is commonly used for the container. This is because stainless steel is generally corrosion resistant, is easily formed or machined into a miniature container and is electrically conductive so the container itself can form one terminal of the cell.

In certain flat cell constructions, the second cell terminal is a pin which extends through a hermetically sealed opening in the cell wall. Miniature cells of this type are often constructed so that the cell components such as the anode, cathode and electrolyte are arranged in substantially flat superimposed layers. As used herein, the anode or negative electrode describes the cell material which is oxidized and the cathode or positive electrode includes the cell material which is reduced during cell discharge.

A typical 1.5 to 4 volt miniature cell of this type which measures less than 0.5 inch in diameter and less than about 0.2 inch thick has as its anode, a lithium metal wafer about 0.02 inch thick. The cathode of the cell would vary in thickness depending upon its type and density. For example, a typical cathode which comprises a pressed powder mixture of a conductor, a binder, and an active cathode material such as manganese dioxide ($MnO_2$), would be about 0.06 inch thick. The cathode and anode are separated within the cell by a separator member which also serves as an electrolyte carrier. Either the anode or cathode is laid flat against the bottom of the container (usually made of a ferrous metal such as stainless steel) while the other is connected to the terminal pin extending through a hermetically sealed opening of the container wall.

Preferably the opening about the pin is sealed by a fused glass-to-metal (GTM) seal. The glass member not only hermetically seals the opening but also electronically insulates the pin from the adjacent ferrous metal container wall.

The GTM seal has been a problem area in cell construction, particularly in high voltage cell systems which utilize lithium as the negative electrode. For example, it has been found that during storage, a conductive corrosive deposit grows from the anode across the surface of the GTM toward the cathode until eventually the glass seal is bridged and the cell shorts.

Efforts to prevent premature failure of the cell and thereby prolong the shelf life of a lithium cell have concentrated primarily on the GTM hermetic seal and/or effective coatings for the seal.

For example, Sandia Report #83-2314 of September, 1984, "Glass Corrosion in Liquid Lithium", suggests that certain glass compositions are better able to withstand corrosion by liquid lithium than others. In U.S. Pat. No. 4,168,351, corosion of a GTM seal is retarded by coating the entire glass surface exposed to the interior of the cell with a protective material such as a metal oxide, polyolefin or fluorocarbon polymer. In U.S. Pat. No. 4,233,372, an inert polymeric coating is applied over the glass surface exposed to the cell environment to reduce chemical attack on the glass and in European Pat. No. 35,074 the exposed glass surface is protected by a silicone layer. A still further solution to the problem of glass corrosion is proposed by U.S. Pat. No. 4,308,323 wherein the resistance of the glass to chemical attack is improved by a graded GTM seal composed of one glass composition bonded to the terminal pin and another glass composition bonded to the wall of the container.

In the present invention, the shelf life of the cell is prolonged regardless of the composition of the glass in the GTM seal or the make-up of the seal. This is accomplished by controlling both the materials of construction of cell components and the arrangement of these components within the cell.

Accordingly, the invention is an improved cell construction for hermetically sealed cells of the type having a terminal pin extending through a wall of the cell housing and electrically insulated from the wall by a GTM seal. While the invention is applicable to a variety of cell configurations and voltages, it is preferred in high voltage cells having an open circuit voltage in the range of about 2.0 volts and above.

SUMMARY OF THE INVENTION

The present invention may be characterized by an electrochemical cell comprising:

(a) a ferrous metal housing having an opening in a wall of the housing;

(b) a non-ferrous metal terminal pin secured within said opening and electronically insulated from said housing;

(c) an anode, a cathode and an electrolyte disposed within said housing, said anode being selected from the group consisting of alkali metals, alkaline earth metals and alloys thereof, said anode being electronically connected to said housing thereby rendering said housing the anodic terminal of said cell; and (d) a non-ferrous metal cathode collector electronically connected to said cathode and to said terminal pin thereby rendering said terminal pin the cathodic terminal of said cell.

Preferably, a GTM seal is used to secure the terminal pin in the opening and to electronicaly isolate the terminal pin from the housing. However, as used hereafter the term "glass" includes ceramics and various types of glasses commonly used in GTM seals, such as borosilicate glass, or the composite glass seals of the type disclosed in U.S. Pat. No. 4,308,323.

It has been found that in cell systems having an alkali metal such as lithium as the anode material, the life of the GTM seal for the cell is increased and the shelf life of the cell is prolonged by altering cell construction so as to electronically insulate the active cathode from contact with ferrous metal components of the cell.

Thus, in the cell construction according to the present invention, the lithium metal anode is electronically connected to a ferrous metal housing so that the housing itself becomes the anodic terminal of the cell. The cathode is electronically connected to a terminal pin so that the pin is the cathodic terminal of the cell. In order to provide better contact between the cathode and the terminal pin, a conductive cathode collector is provided which contacts a portion of the cathode surface. The cathode collector is then electronically connected to the terminal pin.

In addition, any cell component electronically connected to the cathode, including the cathode collector and terminal pin, preferably should be made of a non-ferrous metal. This is because it has been found that the conductive corrosive deposit on the surface of the GTM seal is drastically reduced if both the terminal pin and the collector grid in contact with the active cathode are made of a non-ferrous metal.

The reasons for the deposition of a corrosive material on the GTM seal are not completely understood. One theory is that the extent of the surface area of contact between the cathode and any ferrous metal component of the cell in some way contributes to the rate of the deposition and corrosion. In the present invention, direct association of the cathode with any ferrous metal component is eliminated by placing the lithium metal anode in electronic contact with the ferrous metal container and by making the terminal pin and cathode collector, which electronically contact the cathode, of a non-ferrous metal such as molybdenum.

While it is preferred to use lithium as the material of the anode, any suitable alkali metal including sodium, an alkali metal alloy, an alkaline earth metal or an alkaline earth metal alloy can be used as the anode material.

Non-ferrous metals suitable for use as the terminal pin and cathode collector include molybdenum, tantalum, titanium and tungsten.

Cathodes for use in the present invention are well known in the art and include such solid and liquid active cathode materials as $MnO_2$, $TiS_2$, $FeS_2$, $Sb_2S_3$, $MoS_3$, $SO_2$, $SOCl_2$, $SO_2Cl_2$, $C_2F$, $CF_x$ (where x is above 0.0 to about 1.2) or mixtures thereof.

Electrolytes for use in the present invention are well known and can be either in solid or liquid form. For example a solid electrolyte can be used with a liquid or solid active cathode material and a liquid electrolyte used with a solid active cathode material.

Glasses suitable for the GTM seal about the terminal pin also are well known in the art. These include, for example, the glass compositions described in U.S. Pat. Nos. 4,308,323, 4,168,351 and conventional borosilicate glass.

DESCRIPTION OF THE DRAWINGS

FIG. 1 is an elevational view, partly broken away and in section, showing a flat electrochemical cell embodiment of the present invention; and FIG. 2 is a graph showing open circuit voltage, over time, of several comparable cells including a cell constructed in accordance with the present invention.

DESCRIPTION OF THE PREFERRED EMBODIMENT

Referring to the drawings, FIG. 1 shows an electrochemical cell in accordance with the present invention, generally indicated at 10. The cell includes a housing which consists of an open-ended container 12 and a cover 14 for the open end, both formed of a ferrous metal such as stainless steel. The container has a bottom wall 16, and an upstanding side wall 18. The open end of the container is closed by the cover 14 which can be considered a top wall of the container because it is welded or otherwise hermetically sealed about its outer periphery 15 to the container side wall 18.

Cover 14 has an opening 20 to accommodate the passage of a cylindrical terminal pin 22 through the cover 14 and into the container. Preferably, terminal pin 22 is of a non-ferrous metal such as molybdenum. A glass bead 24 is disposed within the opening 20 and is fused to both the terminal pin 22 and to the adjacent portion of cover 14 which defines opening 20. In this fashion the fused glass bead 24 secures the terminal pin within the opening, provides a hermetic seal means between terminal pin 22 and cover 14 and electrically insulates the terminal pin from the container 12.

The electrochemical cell system within container 12 includes a lithium anode 26. In the embodiment as shown, the anode is in the form of a relatively thin wafer of lithium having one of its flat surfaces disposed against the inner surface of the container bottom wall 16. This electronically connects the anode to the container 12 thereby rendering it the anodic terminal of the cell.

Also disposed within the container is a cathode assembly 28 including a cathode 30 and a cathode collector 32. The preferred cathode is conventional and consists of a pressed powder mixture of a conductor, a binder and an active cathode material such as $MnO_2$.

The cathode collector 32 preferably is a disc made of a non-ferrous metal such as molybdenum. The cathode collector in the form of a disc provides support for the cathode mixture which is pressed against the disc so that a face 34 of the cathode contacts the cathode collector and electronically connects the cathode and cathode collector.

The cathode collector 32 in turn is connected to terminal pin 22 by any suitable mechanical and electrical connection which electronically connects the cathode collector 32 and the terminal pin 22 thereby rendering the terminal pin 22 the cathodic terminal of the cell.

As shown in FIG. 1, cathode face 34 has a portion of its surface defining a recess 38 and the lower end 36 of the cylindrical terminal pin 22, extended through an opening 33 in the cathode collector, is received in the recess. The recess is large enough so that the surface which defines the recess is spaced from the terminal pin lower end 36 to provide clearance around the end portion of the terminal pin received in the recess. This clearance insures that the fused glass bead 24 is not subjected to stress when the cell is assembled. In this respect, during the course of assembly, cover 14 together with terminal pin 22 and GTM seal formed by glass bead 24 is preassembled and then later attached as a unit to container 12. Should the lower end 36 of the terminal pin press against the active cathode during such assembly, the resulting axial force on the terminal pin could cause damage to, or even failure of, the GTM seal. The clearance about the terminal pin as provided by the recess insures that such contact does not occur.

Disposed between the anode 26 and the active cathode 30 is a separator 40. The separator is conventional and is made from a non-conductive ion permeable material. In the preferred embodiment the separator is a felted glass fiber fabric impregnated with an electrolyte solution.

Completing the cell structure is an electronically insulating layer 42 which extends between the cathode collector and cover 14. The insulating layer includes a depending peripheral portion 44 which extends down to the separator 40 so as to maintain the cathode electronically insulated from the cell housing.

As set out hereinabove it has been found that the shelf life of an electrochemical cell employing lithium as the anode material can be greatly improved by eliminating the contact of the active cathode with any ferrous metal component used in the cell construction. This is demonstrated by the following examples:

EXAMPLE 1

An electrochemical cell was fabricated substantially in accordance with FIG. 1. The cell housing was a stainless steel container measuring 0.453 inch in diameter by 0.146 high with a wall thickness of 0.010 inch. The components within the housing, aranged as shown in FIG. 1, included an 0.020 inch thick lithium wafer about 0.340 inch in diameter. The separator was a felted glass fiber fabric impregnated with a 50/50 mixture of propylene carbonate and dimethoxyethane containing one molar $LiCF_3SO_3$ as the liquid electrolyte. The cathode utilized $MnO_2$ as the active cathode material and was 0.060 inch thick and about 0.360 inch in diameter. Both the cathode collector and terminal pin were made of molybdenum.

As fabricated, the average open circuit voltage of five cells was 3.42 volts. These cells were then held at a temperature of 90° C. and the open circuit voltage was measured periodically. The result of this test is illustrated by curve I in FIG. 2. Curve I shows that after a period of fourteen (14) weeks the average open circuit voltage of the five cells was 3.32 volts. Thus the cells on average, were still at about 97% of their initial open circuit voltage. Moreover at the end of twenty-nine weeks, the cells, on average, were still displaying an open circuit voltage of about 3.32 volts.

EXAMPLE 2

A control, consisting of a second group of cells, was fabricated identical to the cells of Example 1 except that a stainless steel cathode collector was used instead of a molybdenum cathode collector. As fabricated, five cells had, on the average, an open circuit voltage of 3.42 volts. These cells were also held at a temperature of 90° C. and tested periodically.

As illustrated by curve II in FIG. 2, the open circuit voltage of these cells (curve II) dropped faster than did that of the cells of Example 1 (curve I). After nine weeks the control open circuit voltage was down to 3.13 volts. After thirteen (13) weeks the control open circuit voltage had dropped to 2.49 volts or about 73% of their initial open circuit voltage.

EXAMPLE 3

A second control, consisting of a third group of cells, was fabricated identical to the cells of Example 2 except that the relative positions of the anode and cathode were reversed.

In these control cells, the cathode contacted the bottom surface of the stainless steel container thereby rendering the cell container the cathodic terminal of the cell. The lithium metal anode, through its contact with the anode collector, electronically contacted the terminal pin thereby rendering the terminal pin the anodic terminal of the cell. Like the cells of Example 2, the terminal pn was made of molybdenum and the collector (in contact with the lithium anode) was of stainless steel. The cells, constructed in this fashion, had on the average an open circuit voltage of 3.41 volts. As shown by curve III, after only four weeks at a temperature of 90° C., the open circuit voltage of these cells had dropped, on the average, to only 2.26 volts or about 77% of the initial open circuit voltage.

As demonstrated in these tests and as illustrated in the curves of FIG. 2, cells constructed according to the present invention (curve I) experienced a longer shelf life than either of the controls (curves II and III). A comparison of the Example 2 (curve II) and Example 3 (curve III) tests shows that there is an increase in shelf life simply by reversing the polarity of the cell so as to place the lithium anode in electronic contact with the stainless steel housing. A comparison of Example 1 (curve I) and Example 2 (curve II) demonstrates that a still further increase in shelf life is obtained by maintaining the cathode in electronic contact with only non-ferrous metal components of the cell.

Thus it should be appreciated that the present invention provides lithium anode cells with a prolonged shelf life and enhanced long-term open circuit voltage characteristics.

Having described the invention in detail, what is claimed as new is:

1. An electrochemical cell comprising
   (a) a ferrous metal housing having an opening through a wall of said housing;
   (b) a non-ferrous metal terminal pin secured within said opening and electronically insulated from said housing;
   (c) an anode, a cathode and an electrolyte disposed within said housing, said anode being selected from the group consisting of alkali metals, alkaline earth metals and alloys thereof, said anode being electronically connected to said housing thereby rendering said housing the anodic terminal of said cell; and
   (d) a non-ferrous metal cathode collector electronically connected to said cathode and to said terminal pin thereby rendering said terminal pin the cathodic terminal of said cell.

2. An electrochemical cell as in claim 1 having a glass member in said opening, said glass member being fused to said terminal pin and to an adjacent portion of said wall which defines said opening, and said glass member providing hermetic seal means for securing said terminal pin within said opening and for electronically insulating said terminal pin from said housing.

3. An electrochemical cell as in claim 1 wherein said anode is lithium.

4. An electrochemical cell as in claim 1 wherein said anode, cathode, and electrolyte are arranged within said ferrous metal housing in substantially flat superimposed layers with said electrolyte being disposed between said anode and cathode.

5. An electrochemical cell as in claim 1, 3 or 4 wherein said housing has a substantially flat internal surface and said anode is in the form of a wafer disposed against said substantially flat internal surface.

6. An electrochemical cell as in claim 1 or 4 wherein said cathode comprises a pressed powdered mixture of an active cathode material, a conductor and a binder.

7. An electrochemical cell as in claim 6 wherein said active cathode material is $MnO_2$.

8. An electrochemical cell as in claim 1 wherein said cathode includes an active cathode material selected from the group consisting of $MnO_2$, $TiS_2$, $FeS_2$, $Sb_2S_3$, $MoS_3$, $SO_2$, $SOCl_2$, $SO_2Cl_2$, $C_2F$, $CF_x$ (where x is above 0.0 to about 1.2) and mixtures thereof.

9. An electrochemical cell as in claim 1 wherein said non-ferrous metal terminal pin is molybdenum.

10. An electrochemical cell as in claim 1 or 9 wherein said non-ferrous cathode collector is molybdenum.

11. An electrochemical cell as in claim 1 wherein said electrolyte is a solid electrolyte.

12. An electrochemical cell as in claim 1 wherein said electrolyte is a liquid electrolyte.

13. An electrochemical cell as in claim 11 including a porous separator disposed between said anode and cathode which is impregnated with said liquid electrolyte.

14. An electrochemical cell as in claim 1 wherein said cathode is a solid having a surface which defines a recess in one face of said cathode; said non-ferrous metal cathode collector is disposed at said one face and has an opening in registry with said recess; and said non-ferrous metal terminal pin has an end portion extended through said opening and into said recess, the size of said recess being such that said terminal pin end portion and said surface define a space therebetween to provide a clearance about said terminal pin end portion.

15. An electrochemicall cell as in claim 1 wherein said housing comprises a stainless steel container having a base, an upstanding wall which defines an open end of said container, and a stainless steel cover hermetically sealing said open end, said cover having a passage therethrough defining said opening.

16. An electrochemical cell comprising:
(a) a ferrous metal housing comprising a container having a base, an upstanding wall which defines an open end of said container and a cover hermetically sealing said open end, said cover having an opening therethrough;
(b) a lithium anode, a cathode and an electrolyte disposed in said housing in substantially flat superimposed layers with said lithium anode being electronically connected to said housing thereby rendering said housing the anodic terminal of said cell;
(c) said cathode comprising a pressed powdered mixture of a conductor, a binder and $MnO_2$ as the active cathode material;
(d) a non-ferrous metal cathode collector disposed against and in contact with said cathode;
(e) a non-ferrous metal terminal pin extending through said cover opening with a lower portion of said terminal pin being electronically connected to said cathode collector thereby rendering said cell terminal pin the cathodic terminal of said cell; and
(f) hermetic seal means in said cover opening formed by a glass bead fused to said terminal pin and said cover for supporting said pin in said opening and electronically insulating said pin from said cover.

* * * * *